March 31, 1931. R. V. JUDSON 1,798,741
MATERIAL HANDLING ROLL
Original Filed July 1, 1920
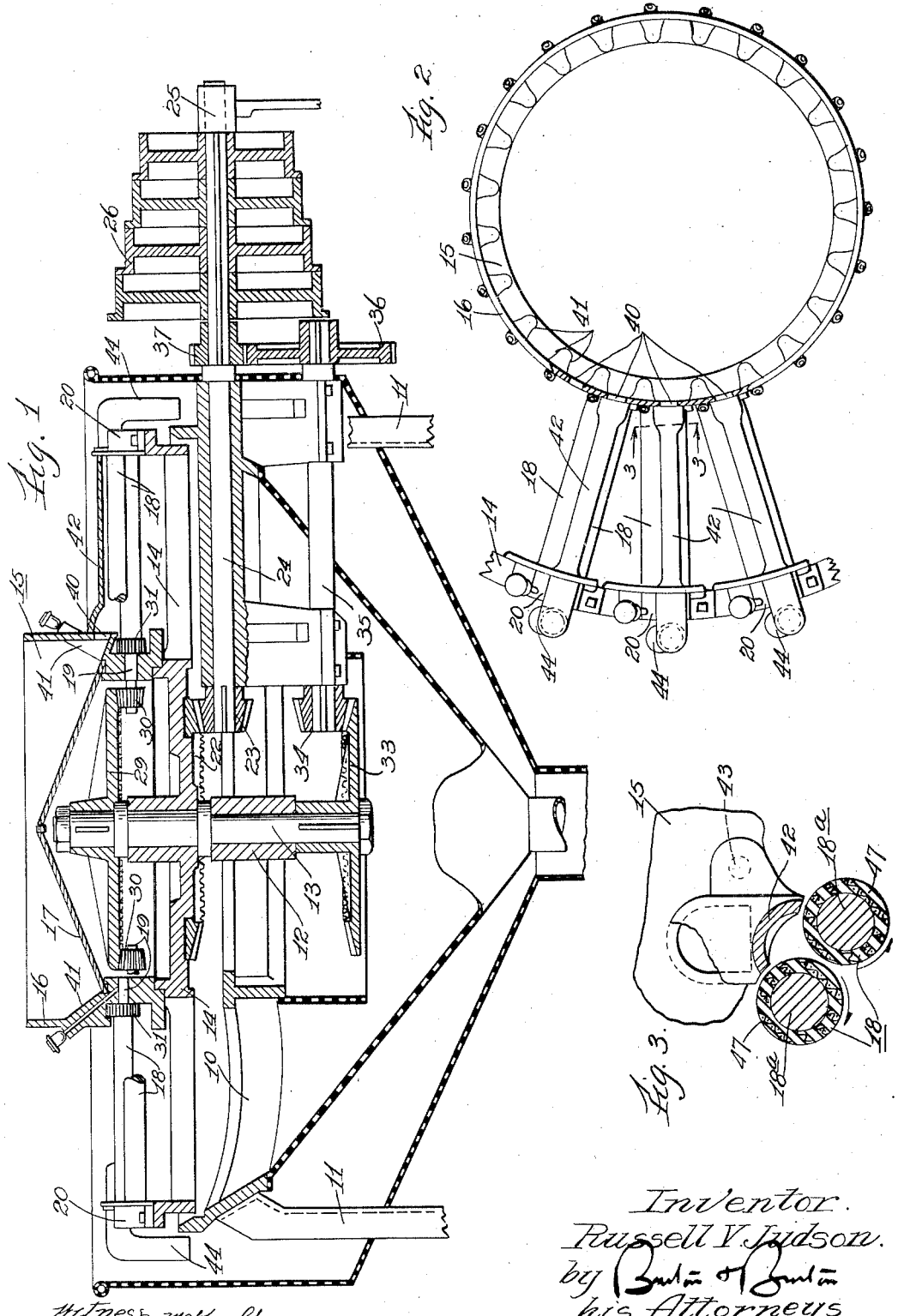
Inventor.
Russell V. Judson.
by his Attorneys Patented Mar. 31, 1931

1,798,741

UNITED STATES PATENT OFFICE

RUSSELL V. JUDSON, OF DETROIT, MICHIGAN

MATERIAL-HANDLING ROLL

Original application filed July 1, 1920, Serial No. 393,395. Divided and this application filed December 7, 1928. Serial No. 324,381.

This invention relates to certain improvements and refinements in machines of the type adapted to mechanically and automatically segregate the better grades of grain from the poorer grades and from the dirt and foreign substances mixed therewith, as disclosed in my Patent No. 1,703,342 dated February 26, 1929, of which the present application is a division and continuation. The purpose of the invention is to provide certain improvements in troughing rolls for machines of this character wherein the injury to the better grades of grain which may be separated out with the poorer grades or refuse, is reduced to a minimum, thus permitting it to be salvaged by re-separation, and reducing the percentage of waste. It consists in certain features and elements of construction, herein shown and described, as indicated by the claims.

In the drawings:

Figure 1 is a vertical sectional view of a machine provided with the improved troughing rolls embodying this invention.

Figure 2 is a fragmentary plan view of the machine with certain parts broken away and omitted and others in section.

Figure 3 is an enlarged transverse sectional view through the troughing or separating rolls and cooperating cover, taken substantially as indicated at lines, 3—3, on Figure 2.

For the purpose of illustration the machine shown in the drawings is similar to that disclosed in my above referred to co-pending application, and comprises a main frame, 10, supported on legs, 11, and having a central vertical bearing, 12, in which is journaled an upright shaft, 13. Loosely journaled on said shaft above the bearing for horizontal rotation, is a carrier frame, 14, upon which is centrally mounted the receiving and distributing hopper, 15, having an upright peripheral wall, 16, and a conical bottom, 17. Journaled on the carrier frame in radial relation to the axis of shaft, 13, are a plurality of pairs of horizontally disposed "troughing" or sorting rolls, 18, revoluble with the carrier frame about said axis. The rolls are each provided with a shaft, 18$^a$, for a core having projecting portions, 19, at each end, the inner end being journaled in the lower portion of the hopper, 15, and the outer ends journaled in bearings, 20, secured to the outer periphery of the carrier frame, 14. The carrier frame is rotated by means of a bevel gear, 22, secured to its under side, which is meshed with a pinion, 23, secured on the end of a drive shaft, 24, journaled in the main frame and in an outboard bearing, 25. A step pulley, 26, is provided on the outer end of shaft, 24, adapted to be driven by a belt (not shown) from a suitable source of power, the belt being shiftable in the usual manner for varying the speed of rotation.

On the upper end of shaft, 13, is keyed a miter bevel gear, 29, meshing with a plurality of bevel pinions, 30, one of which is secured on an inwardly extending end of one of the roll shafts of each pair. The other roll of each pair is driven from the first by a pair of spur pinions, 31, carried by the respective shafts. It will be understood that the drive through the gearing is such that the rolls turn in opposite directions and toward each other on the upper side. The shaft, 13, is driven by a bevel gear, 33, secured to its lower end and meshed with a bevel pinion, 34, on shaft, 35, journaled in the main frame and driven by spur gears, 36 and 37, on shaft, 35 and 24, respectively. These gears may be replaced by others of different ratio so that the speed of rotation of the rolls through the gearing may be varied with respect to the speed of rotation of the carrier frame. This is especially desirable to adapt the machine to various classes of grain.

The wall, 16, of the receiving hopper is provided with a plurality of ports, 40, each leading to the trough formed between a pair of the rolls, 18. Ribs, 41, are formed around the inside of wall, 16, on opposite sides of each of the ports to form pockets for collecting the grain and directing it through the ports. Covers, 42, are positioned to enclose the trough portion of each pair of rolls and are pivoted at 43, to the wall, 16, of the hopper the outer end being hinged in bearing, 20, on the outer edge of the carrier frame, to afford access to the rolls. This cover also tends to confine or direct the grain to the trough formed by the rolls. The end bearings, 20, are shaped to conform to the contour of the pair of co-operating rolls so that it serves as an extension of the trough formed by the rolls, permitting the grain to be fed thereover to the downwardly extending discharge spout, 44.

It will be understood that the grain from the hopper, 15, is fed through the ports, 40, by gravity during the rotation of the hopper, the grain being caused to move outwardly in a radial direction along the rolls by centrifugal force and discharged at the outer ends of the rolls to the spout.

The co-operating rolls of each pair are preferably arranged with the axis of one roll vertically and horizontally offset from the axis of the other as shown in Figure 3. The lower roll is the forward or leading roll with respect to the direction of rotation of the carrier frame, 14, and the upper roll serves as a stop for the grain and, due to the rotation, tends to sweep the grain around into the trough formed by the two rolls; with this arrangement of the rolls, the principal impact of the grain upon the rolls as it leaves the ports, 40, is against the lower roll, because at this point, the centrifugal force is negligible, the grain being fed to the rolls by gravity alone. The shafts, 18ª, which serve as cores for the rolls, are encased with a suitable surface material, 47, such as a rubber-like composition. Preferably the surface material of the upper roll is relatively soft and elastically yielding, and the surface of the lower roll is made somewhat firmer or harder in consistency than the surface of the upper roll. Thus the grain does not become too strongly engaged by the lower roll with which it first comes in contact upon being fed through the adjacent port.

The soft yielding surface of the upper roll more readily engages the grain as it travels outwardly along the trough and co-operating with the lower roll, tends to frictionally grip the rougher and irregular shaped particles of grain, dirt and other foreign matter which may be fed to the rolls, and feed them downwardly between the pair of co-operating rolls for separation from the smoother and more nearly perfect grain which avoids frictional engagement with rolls and is carried along the trough of the rolls by centrifugal force for discharge at their outer ends into a separate collecting chamber. Due to the soft elastically yielding surface of the upper roll, the grain, whether it be rough, irregular, or perfect grain that is accidentally picked up and discharged between the rolls, is not damaged by its passage between them. Thus, the grain and refuse which passes between the rolls may be run through the machine several times to sort out the better grain which at first may be co-mingled and separated with the poorer grades of grain. This reduces the percentage of waste which would otherwise occur through cracking or injury of perfect grain during the sorting or separating process.

Although I have shown and described one form in which my invention may be embodied, it will be understood that it is capable of varied and extensive application without departing from the spirit and scope hereof. I do not therefore wish to be understood as limiting myself to the specific disclosure herein, excepting as indicated by the claims.

I claim:—

1. A pair of co-operating rolls rotatable in opposite directions and positioned for feeding material therebetween, each of said rolls having a surface of material that is uniformly yieldable throughout its length, the surface of one of said rolls being substantially more yieldable than the surface of the other roll.

2. A pair of co-operating rolls rotatable in opposite directions and positioned for feeding material therebetween, said rolls being vertically offset from each other, and each having a surface of material that is uniformly yieldable throughout its length, the surface of material of one of said rolls being substantially more yieldable than the other.

3. A pair of co-operating rolls rotatable in opposite directions and positioned for feeding material therebetween, said rolls being vertically spaced apart and each having a surface of material that is uniformly yieldable throughout its length, the surface of the upper roll being substantially more yieldable than the surface of the lower roll.

4. In a machine of the character described, a pair of co-operating rolls positioned to form a trough for grain, means for driving the rolls in opposite directions, and means tending to cause the grain to move along the rolls in said trough toward one end thereof for discharge, each of said rolls having a surface of material that is uniformly yieldable throughout its length and the surface of one of said rolls being substantially more yieldable than the other.

5. In a machine of the character described, a pair of co-operating rolls having their axes offset vertically and horizontally to form a trough for grain, means for rotating said rolls toward each other with respect to the trough, and means tending to cause the grain to move along the rolls in the trough toward one end thereof for discharge, each of said rolls having a surface of material that is uniformly yieldable throughout its length and the surface of one of said rolls being substantially more yieldable than the surface of the other roll.

6. In a machine of the character described, a pair of co-operating rolls having their axes offset vertically and horizontally to form a trough for grain, means for rotating said rolls toward each other with respect to the trough, and means tending to cause the grain to move along the rolls in the trough toward one end thereof for discharge, both of said rolls being provided with surfaces of yieldable rubber and the surface of the upper roll being substantially more yieldable than the surface of the lower roll.

RUSSELL V. JUDSON.